(12) United States Patent
Frommenwiler

(10) Patent No.: US 6,948,675 B2
(45) Date of Patent: Sep. 27, 2005

(54) APPARATUS AND PROCESS FOR WINDING CABLE-LIKE MATERIAL

(75) Inventor: Franz Frommenwiler, Rothenburg (CH)

(73) Assignee: Komax Holding AG, Dierikon (CH)

( * ) Notice: Subject to any disclaimer, the term of this patent is extended or adjusted under 35 U.S.C. 154(b) by 63 days.

(21) Appl. No.: 10/622,481

(22) Filed: Jul. 21, 2003

(65) Prior Publication Data

US 2004/0104296 A1 Jun. 3, 2004

(30) Foreign Application Priority Data

Jul. 22, 2002 (EP) .............................. 02405636

(51) Int. Cl.[7] .......................... B65H 54/00; B65H 65/00
(52) U.S. Cl. ................ 242/362.2; 242/363; 242/476.6; 242/487.1
(58) Field of Search .............................. 242/362, 362.1, 242/362.2, 362.3, 363, 472.5, 476.6, 487.1

(56) References Cited

U.S. PATENT DOCUMENTS

| 5,427,327 | A | | 6/1995 | Anderson et al. |
| 6,135,164 | A | | 10/2000 | Celoudoux et al. |
| 6,554,217 | B1 | * | 4/2003 | Rodriguez ................. 242/362 |
| 6,669,129 | B1 | * | 12/2003 | Shah ....................... 242/362.2 |

FOREIGN PATENT DOCUMENTS

| DE | 33 43 286 A1 | 6/1985 |
| DE | 34 43 754 A1 | 6/1986 |
| DE | 42 35007 A1 | 4/1994 |
| FR | 2 362 070 A1 | 3/1978 |
| FR | 2 678 135 A1 | 12/1992 |

* cited by examiner

Primary Examiner—John M. Jillions
(74) Attorney, Agent, or Firm—Venable LLP; Stuart I. Smith

(57) ABSTRACT

The invention proposes an apparatus (100) for winding a cable-like material (200), having a winding arrangement (150), a first gripping arrangement (130), for linearly advancing the leading end of the cable-like material (200) and for transferring the same to the winding arrangement (150), and a second gripping arrangement (140), for receiving the abovementioned leading end of the cable-like material from the winding arrangement (150) and for moving this leading end linearly away from the winding arrangement (150). It is possible for the first gripping arrangement (130) to grip the trailing end of the cable-like material (200) and, in conjunction with the second gripping arrangement, even it out to a predetermined difference between the ends. In specific configurations, the winding arrangement (150) has a coil gripper (154), with which the winding operation can be carried out on a winding container (152). The winding arrangement (150) comprises means (180, 182, 184, 186) which allows the coil to be clamped firmly and released. The invention also proposes a corresponding process.

10 Claims, 11 Drawing Sheets

APPARATUS AND PROCESS FOR WINDING CABLE-LIKE MATERIAL

The present invention relates to an apparatus for winding and tying off cable-like conductor materials, e.g. optical waveguides. The invention also relates to a process for winding and tying off such materials.

It is known for cable-like conductor material to be stored, shipped and, to a considerable extent, processed in reel form. In this case, the operations of winding up the material and cutting it to length involve considerable outlay and require high levels of accuracy if the subsequent processing is to be automated to any significant extent. However, such a process and the associated apparatus are already known in principle, e.g. from DE 42 35 007 A1. The latter proposes a process in the case of which the winding material is fed into a drum-like cavity of a non-rotating winding apparatus, the intention being for the material to be positioned in successive loops or layers along the inner circumferential surface of the winding cavity. It is quite possible to use such a process for heavy-duty cable material, in particular for electric lines and wires. However, if the material has to meet specific requirements, e.g. it has to be ensured that the radius of curvature of the cable-like material does not, at any stage of the processing, fall below a certain value, then such a process as is known from DE 42 35 007 A1 is not suitable, as can clearly be gathered from this document, for example, from FIG. 3, since the cable material pushed in is bent in a more or less uncontrolled manner prior to being positioned in the winding cavity.

A type of conductor which tallies with the above-described problem is the optical waveguide, which is damaged if the radius of curvature falls below a predetermined value.

On the other hand, however, it is just as important, during the winding operation, for the two ends of the wind-up material to have a quite specific length. It is mostly a question here, in particular, of the lengths being equal to within approximately 0.1 mm, while the absolute length of the ends can be gathered from the overall length of the piece of cable-like conductor material (predetermined) and the radius of the coil.

The object of the present invention is thus to propose an apparatus and a process in the case of which the conductor material can be wound up with a high level of cutting-to-length accuracy, and if appropriate with very close parity between the ends, without the radius of curvature falling below a certain minimum value, which may well lie in the order of magnitude of the coil radius.

The invention achieves the object by an apparatus according to this disclosure. In this case, the measures of the invention, first of all, result in the situation where, during each step of the winding process, it is possible to ensure a certain radius of curvature of the winding material, where the winding material is only subjected to quite specific loading, and where the end product, namely the wound-up conductor, has two ends with high cutting-to-length and winding accuracy, preferably end lengths which are equal to a high level of accuracy.

A particularly advantageous process for winding corresponding cable material is proposed.

Further advantageous details of the invention are also explained. The measures on the winding arrangement are particularly advantageous here.

The elements which have been mentioned above and those which are claimed and described in the following exemplary embodiments, and are to be used according to the invention, are not subject to any specific exceptional conditions in respect of their size, shaping, use of materials and technical design, with the result that the selection criteria known in the respective application area can be used without limitation.

Furthermore, the apparatus is not restricted to optical waveguides. Both the apparatus and the process can be used for other cable-like conductors, e.g. coaxial cables, etc. This is advantageous, in particular, when it is likewise the case that the material is not to be bent to any more pronounced extent than a predetermined radius of curvature.

Further details, features and advantages of the subject matter of the invention can be gathered from the following description of the associated drawings, in which an apparatus and an associated process sequence for the present invention are explained by way of example.

Figure 1:
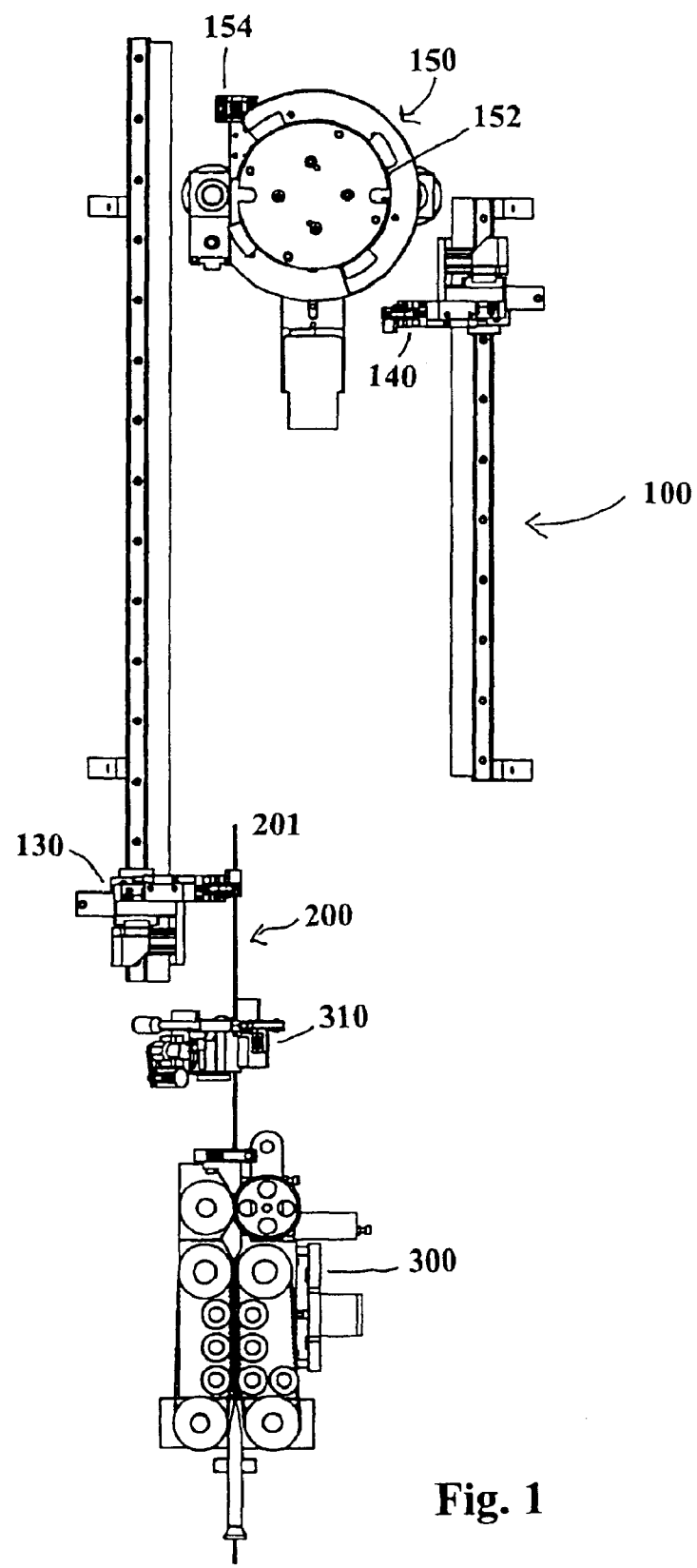
FIG. 1 shows an overview of the apparatus according to the invention with a feed arrangement—which does not necessarily belong to the invention—for optical waveguides; this figure additionally illustrates the transfer of the leading end of the optical waveguide to a first gripper arrangement.

In the apparatus which is intended for winding and evening out a conductor, and is designed 100 as a whole in FIGS. 1 to 5, feeding takes place from a conductor-advancing arrangement 300 with the conductor material 200 which is to be processed. In this initialization state—not illustrated in the drawings—the drag gripper 130 is open and retracted. It is located at the start of the line, that is to say in the vicinity of the conductor-advancing arrangement 300.

The evening-out gripper 140 is likewise open and is located in the vicinity of the winding arrangement 150. The winding container 152 is located in the starting position; the winding-container valve is switched off.

As is illustrated in FIG. 1, the drag gripper 130 then grips the conductor material 200 approximately 10 mm behind the leading end 201 of the line once the conductor-advancing arrangement 300 has advanced this leading end 201 of the line by approximately 90 mm. (A)

The drag gripper 130 is set to a constant tensile force, in the exemplary embodiment described here to a tensile force of approximately 30 N. The line 200 is then advanced by the conductor-advancing arrangement 300—in the exemplary embodiment by approximately 850 mm, in which case the drag gripper 130, rather than providing for the actual advancement, only provides for transporting the advanced conductor material 200 away. (B)

After having travelled approximately 200 mm, the drag gripper 130 is moved outward by approximately 80 mm, in order not to interfere with the winding-container gripper 154. A lateral spacing is thus maintained between the drag gripper 130 and the winding-container gripper 154. In the present exemplary embodiment, this displacement is controlled by a valve—"valve on". As an alternative, however, it is also possible for the leading end 201 to be transferred upstream of the winding container, with the result that interference is avoided by a longitudinal spacing being maintained. As a further alternative, it may be proposed to move the drag gripper 130 upward, in order thus to maintain a vertical spacing in relation to the winding-container gripper 154. As soon as the drag gripper 130 has passed the winding-container gripper 154, the drag gripper is displaced into the old line of travel again—"valve off".

Figure 2:
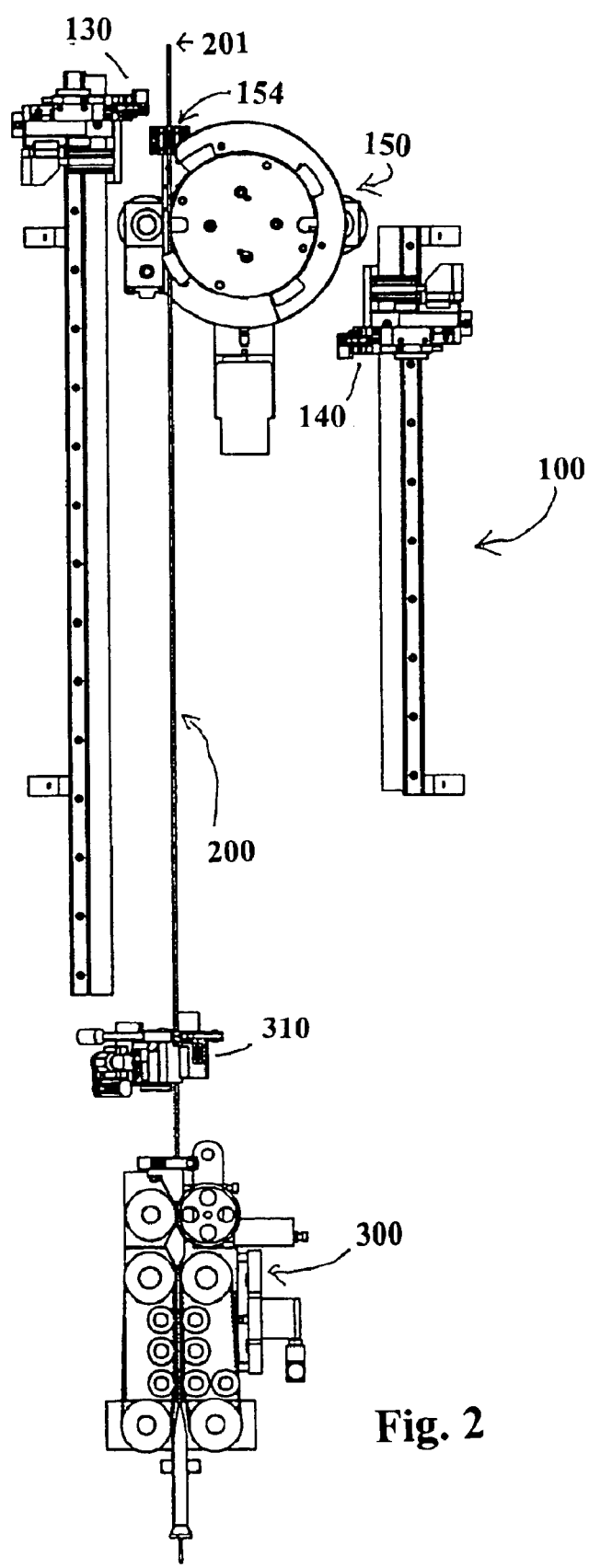
FIG. 2 shows a further illustration of the apparatus according to the invention from FIG. 1; this figure additionally illustrates the transfer of the leading end of the optical waveguide to the coil gripper.

The leading end 201 of the line is then transferred to the winding-container gripper 154, as is illustrated in FIG. 2, that is to say the winding-container gripper 154 grips the line and the drag gripper 130 releases the line. The winding-container gripper 154 closes after approximately 100 ms. The conductor-advancing arrangement 300 is not active for conveying purposes during this time. (C)

The winding-container gripper 154 then begins to wind up the line on the winding container 152 with a constant tensile force—in the exemplary embodiment, once again, 30 N—in which case the winding-container gripper 154, once again, rather than providing for the actual advancement, only provides for transporting the advanced conductor material 200 away. This operation is not actually subject to any limits. The length which is to be wound is freely adjustable, in the exemplary embodiment from approximately 1500 mm to approximately 10,000 mm, it also being possible, of course, for this range to be extended by relatively small changes in dimension. The speed of the advancement of the line is adjustable, in the apparatus described here, from 1 m/s to approximately 5 m/s, while the acceleration is adjustable in the range from 5 m/s2 to approximately 15 m/s2, it also being possible, of course, for these ranges to be extended by relatively small changes. The drag gripper 130 is moved back into the starting position again during this time. (D)

Figure 3:
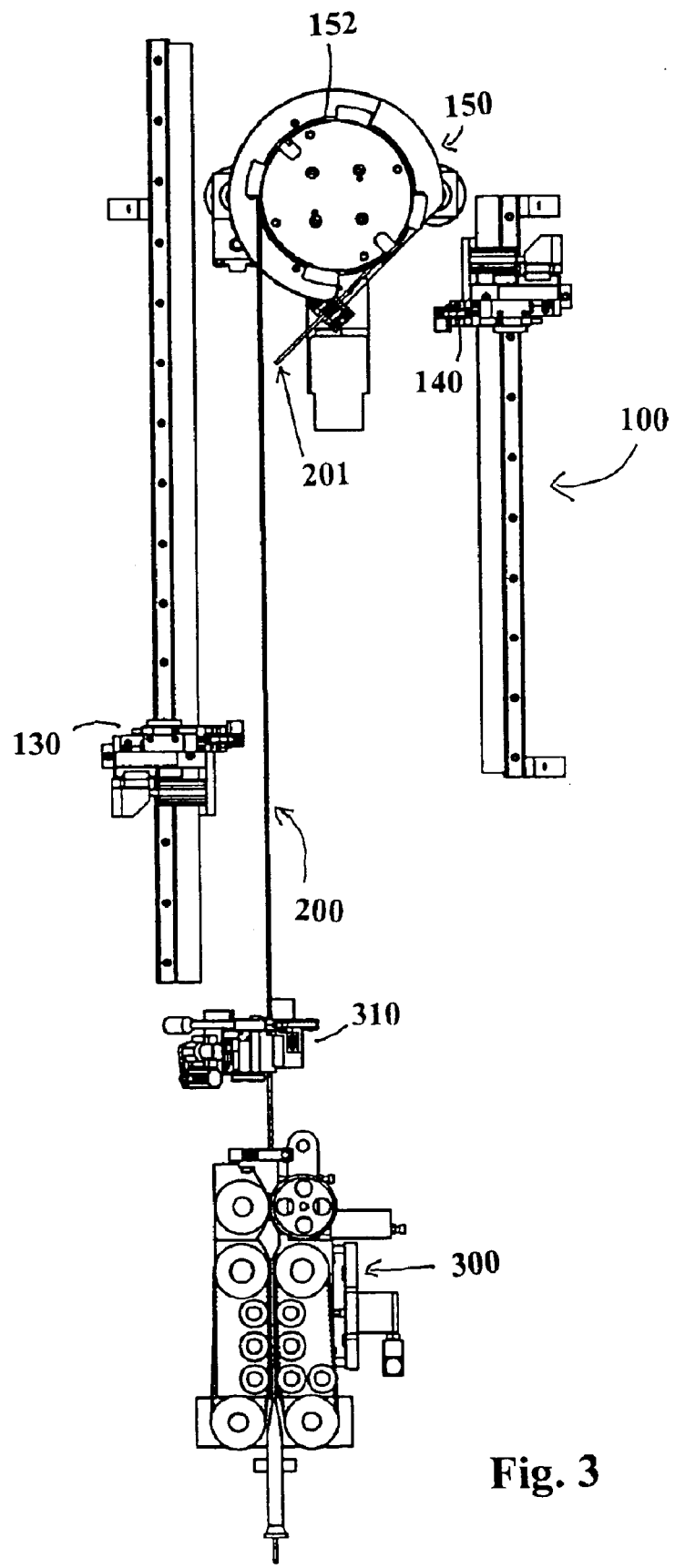
FIG. 3 shows a further illustration of the apparatus according to the invention from FIGS. 1 and 2; this figure additionally illustrates the winding operation.

When the line has reached the envisaged length, as is illustrated in FIG. 3, then the line-advancing arrangement 300 is stopped and the conductor 200 is gripped by the drag gripper 130. (E)

The line is severed with the aid of the severing arrangement 310, once again such that the trailing end 202 of the conductor is at a distance of approximately 10 mm from the gripping point of the drag gripper 130. (F)

Figure 4:
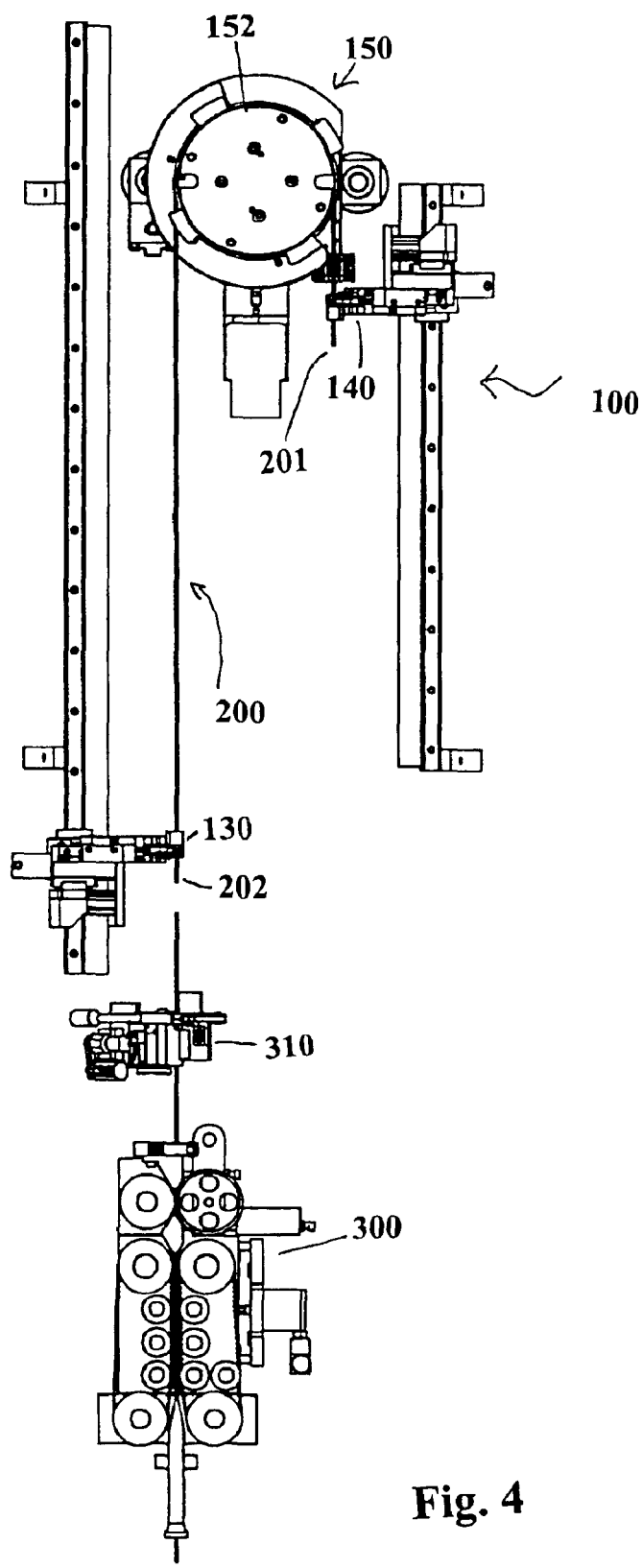
FIG. 4 shows a further illustration of the apparatus according to the invention from FIG. 1; this figure additionally illustrates the steps of cutting the optical waveguide to length and of transferring the trailing end of the optical waveguide to the first gripping arrangement and of transferring the leading end of the optical waveguide to the second gripping arrangement.

A constant tensile force is imparted to the drag gripper 130, in the present exemplary embodiment the tensile force being 20 N. The winding container 152 is rotated until the winding-container gripper 154 assumes a transfer position in relation to the evening-out gripper 140, as is illustrated in FIG. 4. (G)

The evening-out gripper 140 is closed and the winding-container gripper is opened. (H)

Figure 5:
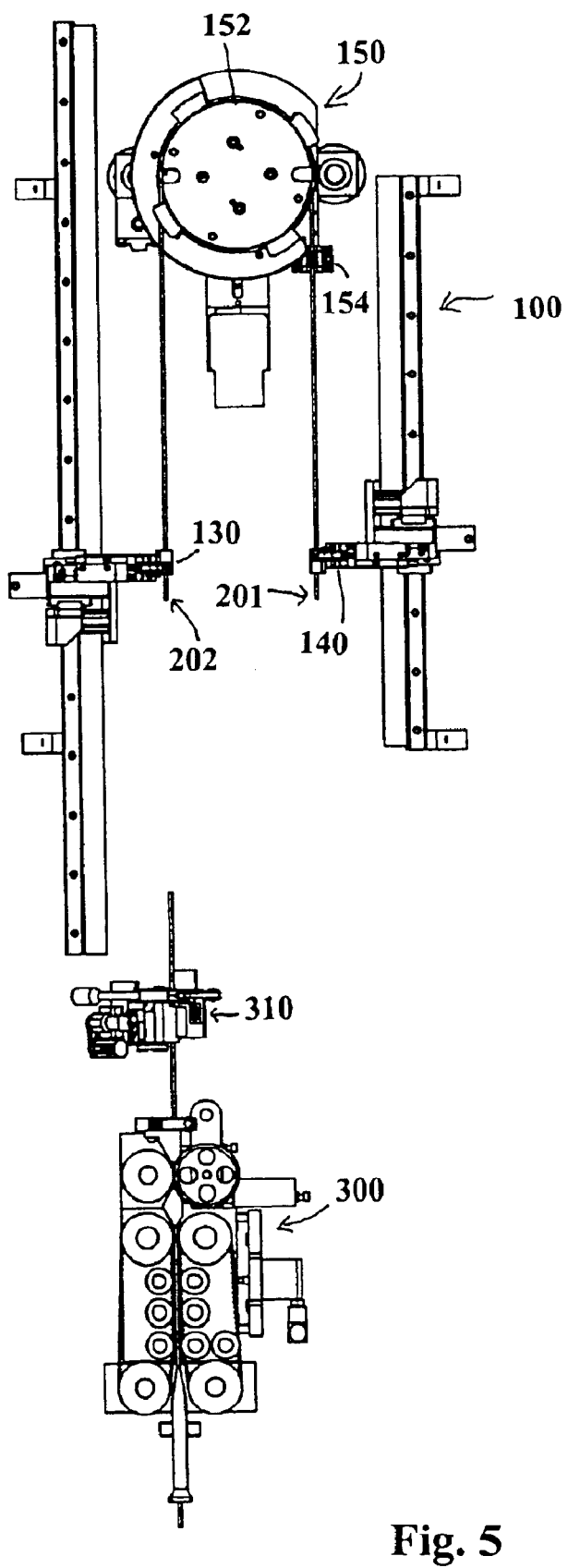
FIG. 5 shows a further illustration of the apparatus according to the invention from FIG. 1; this figure additionally illustrates the process of evening out the two ends of the optical waveguide.

A constant tensile force is imparted in each case to the drag gripper 130 and the evening-out gripper 140, in the present exemplary embodiment the tensile forces are not equal and are 15 N and 25 N, respectively. The winding container 152 is rotated, as is illustrated in FIG. 5, until the conductor ends 201 and 202 have reached the same position. This state is calculated from the positions of the drag gripper 130 and evening-out gripper 140 and the respective overhang of the line—that is to say, in the present exemplary embodiment, 10 mm in each case. (I)

The winding-container wall is relieved of stressing by the valve being switched on. (J)

The winding container is then rotated into the coil-removal position. (K)

Figure 6:
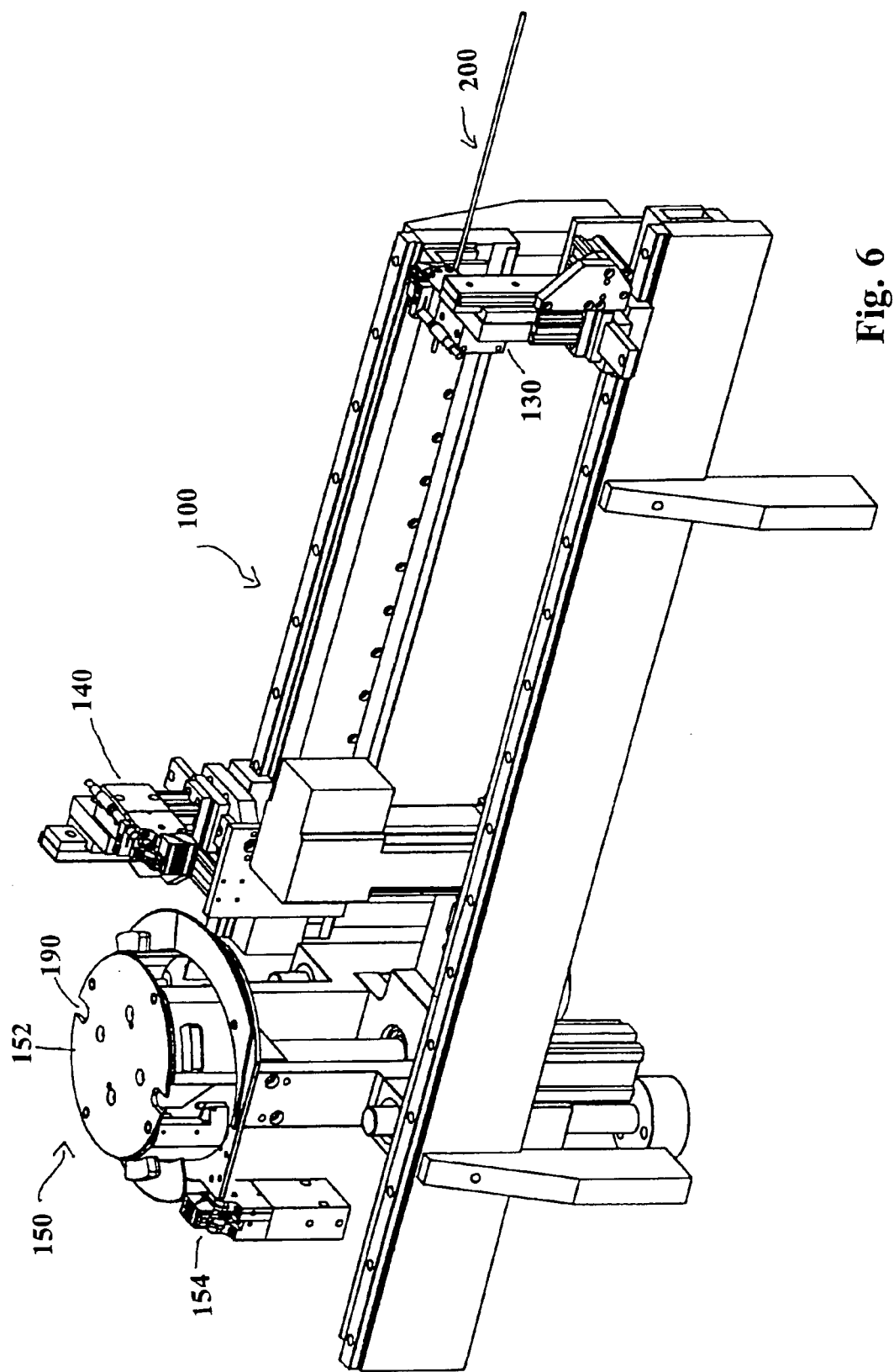
FIG. 6 shows a component-specific illustration of the winding unit of the apparatus according to the invention with the first and the second gripping arrangements (drag gripper and evening-out gripper)
Figure 8:
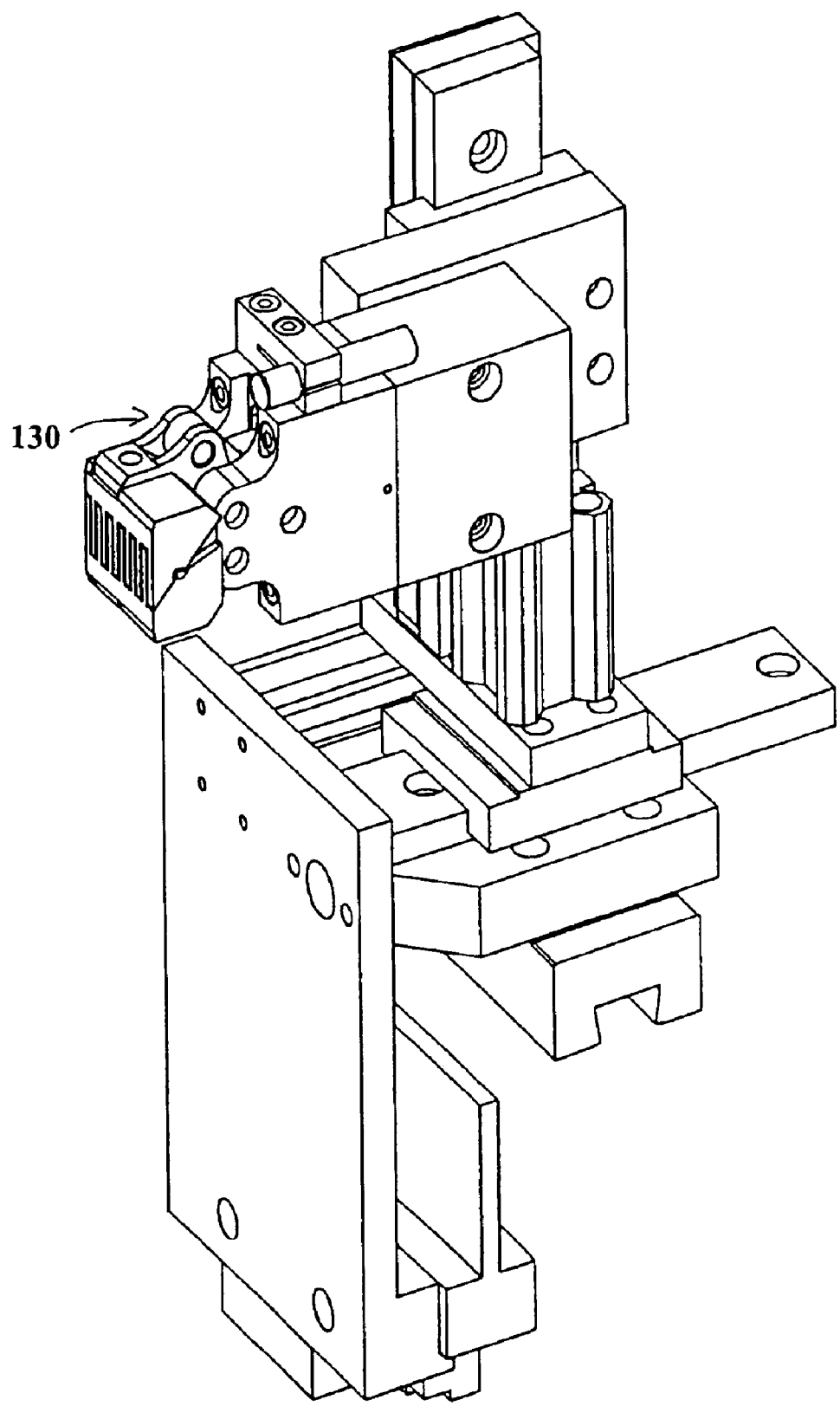
FIG. 8 shows an illustration in detail form of the grippers according to FIG. 6 (drag gripper and evening-out gripper)

FIG. 6 illustrates, in detail form, the winding unit 150 with the drag gripper 130 and the evening-out gripper 140. The drag gripper 130 and evening-out gripper 140 (FIG. 8) are set up such that they are moved with a constant tensile force in both directions. Rather than themselves ensuring the advancement of the conductor 200, they thus only ensure that the conductor is transported away in a controlled manner and such that it is guided in a taut state. Furthermore, they are set up such that a control unit—not depicted in the figure—knows their position at any point in time. In the exemplary embodiment presented, this is realized by linear motors. The two grippers 130 and 140 have an outer, rest position and an inner, gripping position. In the rest position, they are thus set up such that they do not disturb the conductor material 200 located in the apparatus, e.g. when the drag gripper is being moved back away from the winding container 152 and/or the evening-out gripper is being moved back in the direction of the winding container.

Figure 7:
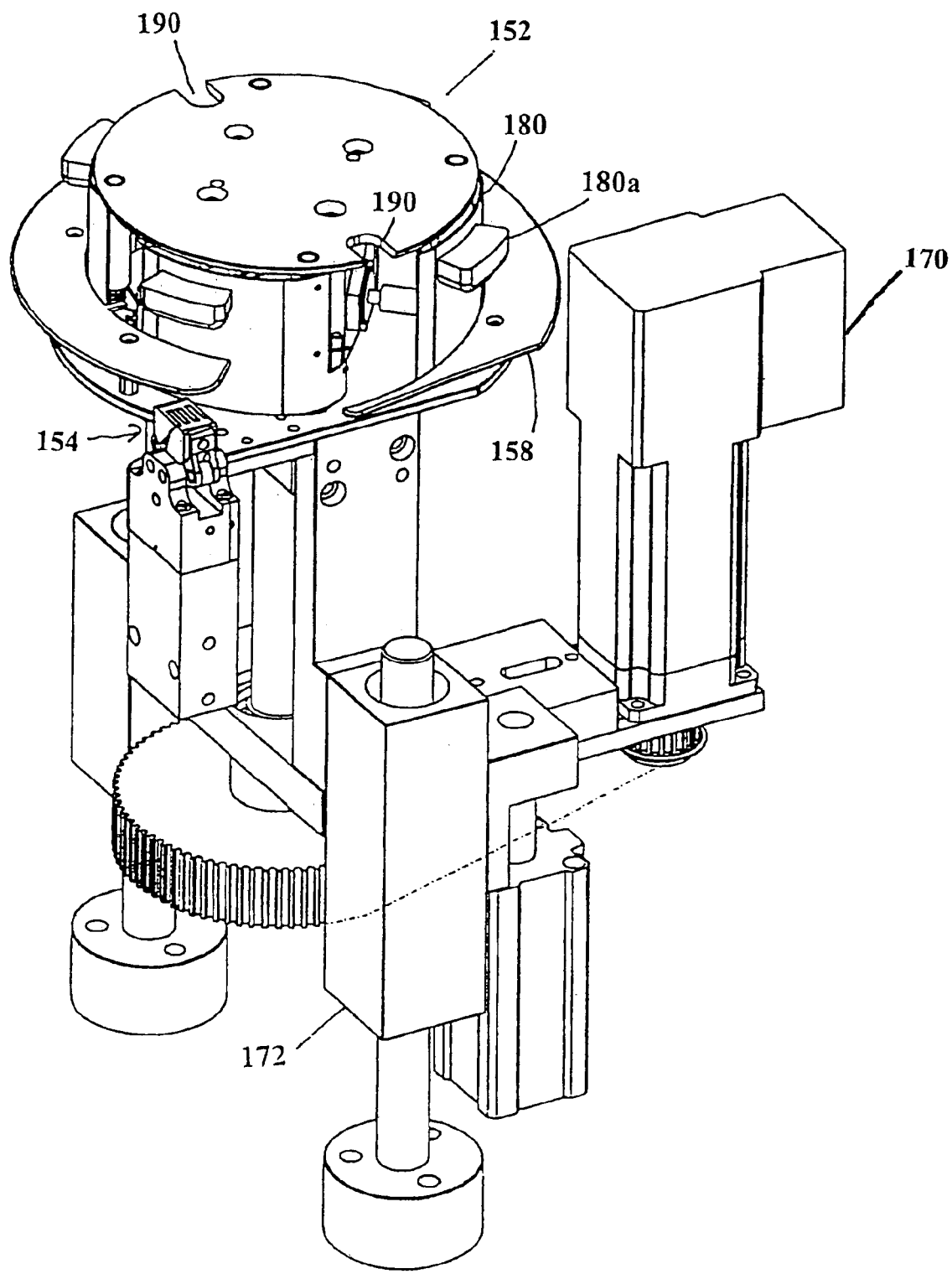
FIG. 7 shows an illustration in detail form of the winding unit according to FIG. 6.

The winding arrangement 150, which is illustrated in detail form in FIG. 7, predominantly comprises a winding container 152, which is driven by a drive arrangement 170, and the coil gripper 154, with a fixed azimuthal relationship with the winding container 152—at least during the winding operation. This mechanism is also realized such that, rather than itself ensuring the advancement of the conductor 200, it only ensures that the conductor is transported away in a controlled manner such that it is guided in a taut state, that is to say it ensures the winding operation. Furthermore, it is likewise set up such that the—in this case azimuthal—position is known to the abovementioned control unit—not depicted in the figures—at any point in time.

Figure 9:
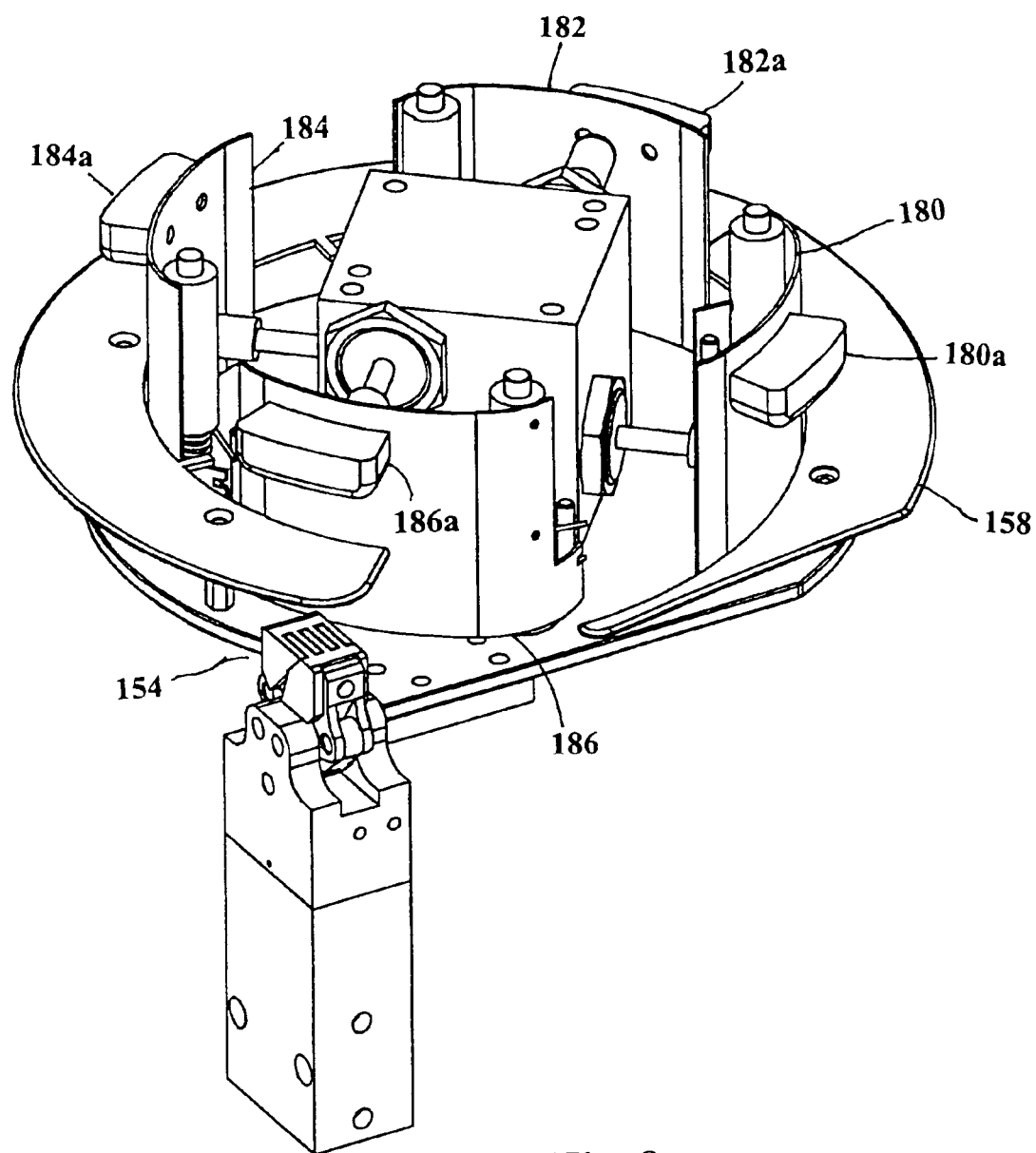
FIG. 9 shows an illustration in detail form of the winding container according to FIG. 6 with guide plate and stressing-relief arrangement.

The winding arrangement 150 can be adjusted in height by a lowering and raising arrangement 172. In its normal functioning state, the winding arrangement is located in a top position, in which the conductor material which is to be wound up is wound up onto the winding container 152. A bottom position is provided for the case where, rather than the apparatus being used for winding purposes, the drag gripper 130 is used, for example, for pieces of cable in the case of which the radius of curvature is of no particular significance, this rendering the apparatus versatile. By virtue of the four elements 180, 182, 184 and 186 which can be swung horizontally into different positions, the winding container 152 set up such that the winding operation is carried out in the swung-out state of these elements 180, 182, 184 and 186, whereas, in the swung-in state, the wound-up conductor material is relieved of stressing and is free in the upward direction. This can be seen from FIG. 9. In the present exemplary embodiment, the swinging mechanism is driven pneumatically.

Arranged beneath the actual winding plane of the winding arrangement 150 is a helical guide plate 158 with an azimuthal length of approximately 300°, it being intended for this plate to ensure that the winding-container gripper 154 does not interfere with the conductor material 200 already wound up on the winding container. Securing elements 180a, 182a, 184a and 186a are arranged above the guide plate, on the elements 180, 182, 184 and 186, which can be swung horizontally into different positions, these securing elements preventing the wound-up conductor material from being able to slide upward.

Figure 10:
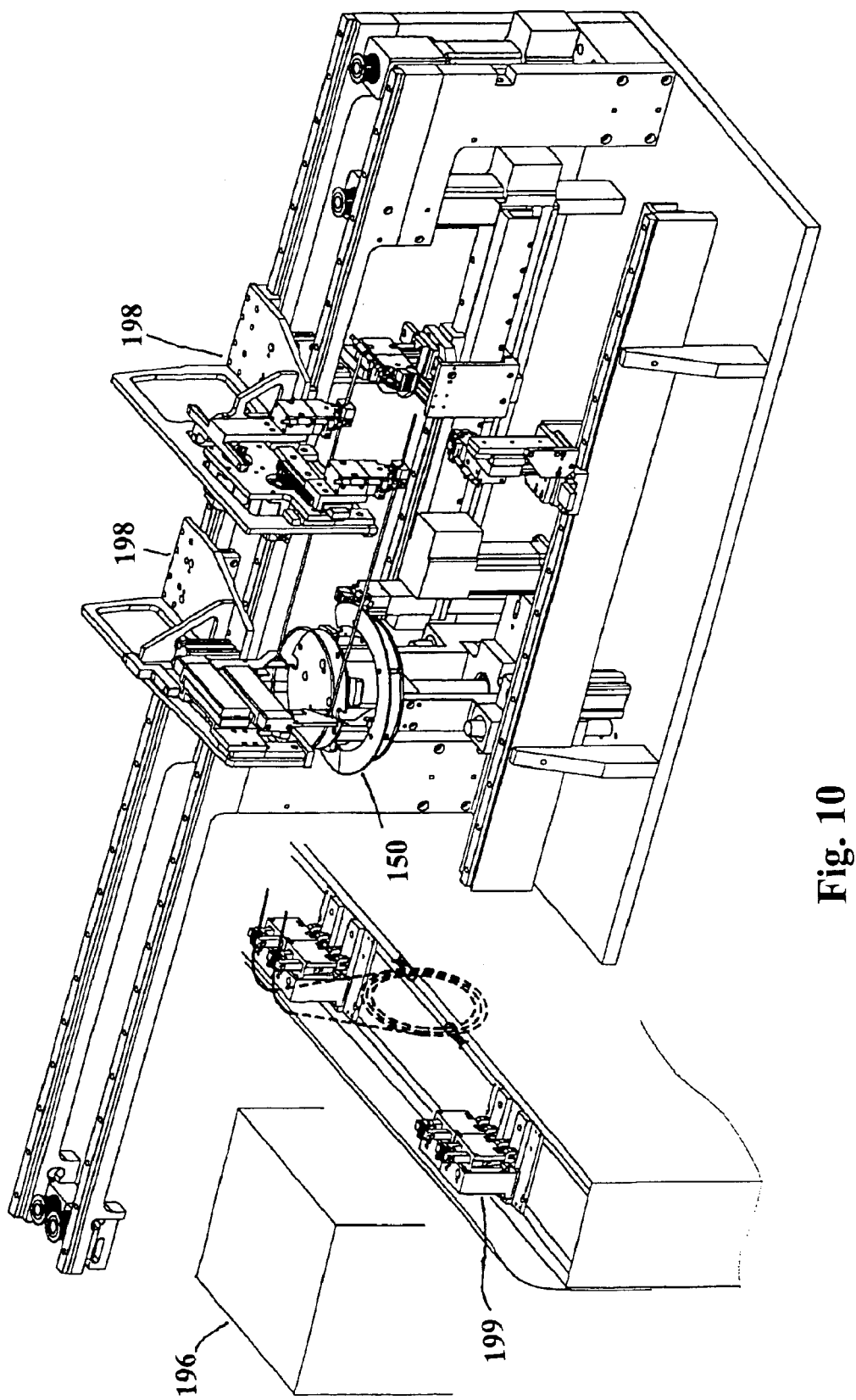
FIG. 10 shows an overview of the apparatus according to FIG. 1, although this overview contains yet further components; illustration in detail form of the winding container according to FIG. 6 with guide plate and stressing-relief arrangement.
Figure 11:
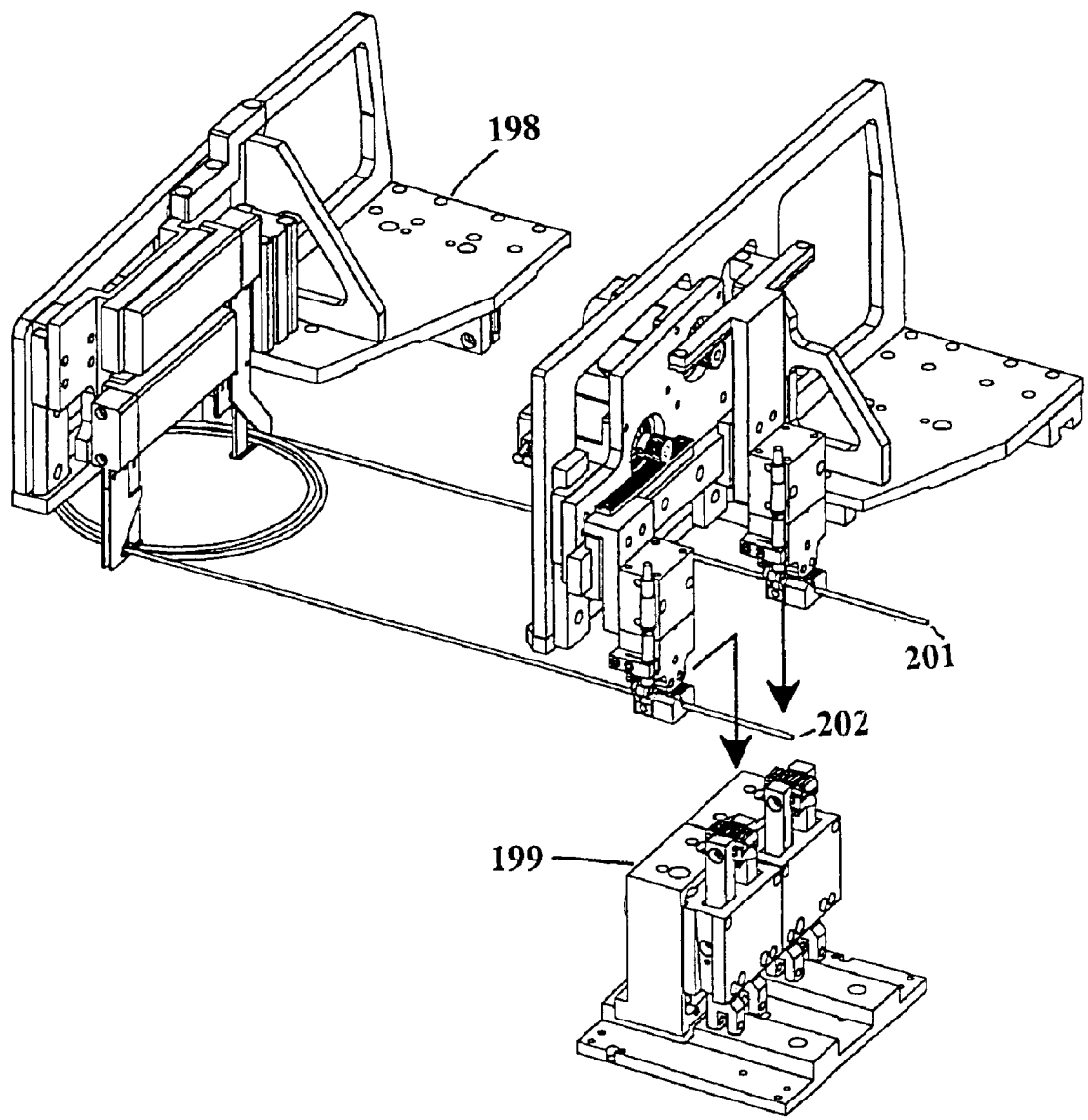
FIG. 11 shows an illustration of the transfer arrangement for transferring the wound reel with evened-out ends.

The top region of the winding arrangement has two mutually opposite recesses 190. These have the purpose of making it possible for the finished reel to be gripped by the unit 198 and raised in order then to be transported further, as is illustrated in FIG. 10. In the present exemplary embodiment, this unit 198 also has the function of transferring this coil to a tying-off unit 196. The reel is then transferred to the transfer carriage 199 of an installation system for further processing (FIG. 11).

The winding-container gripper 154 eventually corresponds, in terms of construction and functioning, to the drag gripper 130 and the evening-out gripper 140. However, the winding-container gripper 154 is connected to the winding arrangement 150 such that its drag operation is azimuthal and it thus winds up the material on the winding container 152. The winding arrangement, which can be rotated in both directions, is connected to a control arrangement such that the azimuthal position, for example, of the coil gripper is known there at any point in time.

What is claimed is:

1. An apparatus for winding a cable-like material, having
   a winding arrangement, on which the cable-like material can be wound up,
   a first gripping arrangement, for linearly advancing the leading end of the cable-like material and for transferring the same to the winding arrangement,
   a second gripping arrangement, for receiving the abovementioned leading end of the cable-like material from the winding arrangement and for moving this leading end linearly away from the winding arrangement, it being the case that
   the abovementioned first gripping arrangement is set up for gripping the trailing end of the cable-like material and, in conjunction with the second gripping arrangement, evening both ends of the cable-like material out to a predetermined difference between the ends.

2. The apparatus as claimed in claim 1, wherein the winding arrangement comprises a coil gripper and a winding container, which coil gripper is set up such that, with it, the winding operation is capable of being carried out on the winding container.

3. The apparatus as claimed in claim 1, wherein the winding arrangement has means which allows the coil to be clamped firmly and released.

4. The apparatus as claimed in claim 3, wherein the means which allows the coil to be clamped firmly and released have securing means which has the effect of bounding the coil in the upward direction.

5. The apparatus as claimed in claim 1, which comprises a guide means for guiding the coil vertically on the winding arrangement and for avoiding the situation where the coil is disturbed by the winding-container gripper.

6. The apparatus as claimed in claim 1, wherein the top region of the winding arrangement has two mutually opposite recesses for tying off the wound reel and transporting it further.

7. A process for winding a cable-like conductor material, having
   a winding arrangement, on which the cable-like conductor material can be wound up and having a winding-container gripper,
   a first gripping arrangement, for linearly advancing the leading end of the cable-like conductor material and for transferring the same to the winding arrangement,
   a second gripping arrangement, for receiving the abovementioned leading end of the cable-like conductor material from the winding arrangement and for moving this leading end linearly away from the winding arrangement, comprising the following steps
   (A) transferring the leading end of the cable-like material to the first gripper arrangement,
   (B) advancing the leading end of the cable-like conductor material and guiding it by way of the first gripping arrangement,
   (C) transferring the leading end of the cable-like material to the winding-container gripper,
   (D) winding the cable-like conductor material on the winding arrangement,
   (E) transferring the trailing end of the cable-like conductor material to the first gripping arrangement,
   (F) cutting the cable-like conductor material to length,
   (H) transferring the leading end of the cable-like conductor material to the second gripping arrangement,
   (I) evening out the two ends of the cable-like conductor material by aligning the first gripper arrangement with the second gripper arrangement,
   (J) relieving the coil on the winding arrangement of stressing.

8. The process as claimed in claim 7, which comprises the additional step of rotating the winding container into a coil-removal position following the stressing-relief step (J).

9. The process as claimed in claim 7, which comprises the additional step, following the step (F) of cutting the cable-like conductor material to length, of rotating the winding container until the winding-container gripper assumes a transfer position in relation to the second gripper arrangement.

10. The process as claimed in claim 7, wherein the first gripper arrangement, for a certain part of the travel path, is moved out of the longitudinal direction in order to avoid interfering with the winding-container gripper, and is moved into the original line of travel again once the first gripper arrangement has passed the winding-container gripper.

* * * * *